(12) United States Patent
Lee

(10) Patent No.: US 11,681,957 B2
(45) Date of Patent: Jun. 20, 2023

(54) METHOD AND APPARATUS FOR OPTIMIZING ALGORITHM-BASED TRAVEL SCHEDULING

(71) Applicant: MG Innovation Lab, Inc., Santa Clara, CA (US)

(72) Inventor: Changhyun Lee, San Jose, CA (US)

(73) Assignee: MG Innovation Lab, Inc., Santa Clara, CA (US)

( * ) Notice: Subject to any disclaimer, the term of this patent is extended or adjusted under 35 U.S.C. 154(b) by 0 days.

(21) Appl. No.: 17/143,446

(22) Filed: Jan. 7, 2021

(65) Prior Publication Data

US 2022/0012650 A1 Jan. 13, 2022

Related U.S. Application Data

(60) Provisional application No. 63/050,033, filed on Jul. 9, 2020.

(51) Int. Cl.
*G06Q 10/02* (2012.01)

(52) U.S. Cl.
CPC .................................. *G06Q 10/025* (2013.01)

(58) Field of Classification Search
CPC .... G06Q 10/025; G06Q 50/14; G01C 21/343; G01C 21/3476
USPC .......................................................... 705/6
See application file for complete search history.

(56) References Cited

U.S. PATENT DOCUMENTS

| 2002/0032521 A1* | 3/2002 | Machii | G01C 21/34 |
| | | | 701/532 |
| 2007/0073562 A1* | 3/2007 | Brice | G06Q 10/02 |
| | | | 705/5 |
| 2015/0317569 A1* | 11/2015 | Renaudie | G06V 20/20 |
| | | | 705/5 |
| 2018/0053121 A1* | 2/2018 | Gonzalez | G06Q 10/025 |
| 2020/0226364 A1* | 7/2020 | Gehler | G06N 3/044 |

OTHER PUBLICATIONS

Ernesto Tarantino, A mobile personalized tourist guide and its user evaluation, Jul. 5, 2019, Springer (Year: 2019).*

* cited by examiner

*Primary Examiner* — Resha Desai
*Assistant Examiner* — Ismail A Manejwala
(74) *Attorney, Agent, or Firm* — Heedong Chae; Lucem, PC

(57) ABSTRACT

A server for optimizing a travel schedule is disclosed. The server includes a database storing travel information provided from a first electronic device and local information provided from a second electronic device and a processor that generates a travel itinerary based on the travel information and the local information. The travel itinerary includes a travel schedule for each time zone in a travel day and time. The travel information includes information about a travel place, a travel day and time, transportation, and accommodations. The local information includes information about traffic in the travel place, accommodations in the travel place, a restaurant in the travel place, a landmark in the travel place, activity in the travel place, or news for the travel place.

11 Claims, 11 Drawing Sheets

METHOD AND APPARATUS FOR OPTIMIZING ALGORITHM-BASED TRAVEL SCHEDULING

CROSS-REFERENCE TO RELATED APPLICATION(S)

This application is based on and claims priority under 35 U.S.C. § 119 to U.S. patent Application No. 63/050,033, filed on Jul. 9, 2020, in the USPTO, the disclosure of which is incorporated by reference herein its entirety.

BACKGROUND

1. Field

The disclosure relates to a method and an apparatus for providing algorithm-based travel plan scheduling.

2. Description of Related Art

A computing device and a mobile device are used by users for their travel plans and research. For example, the user searches for a place of interest while traveling and writes a travel plan based on information, such as an operating time, a distance, weather, and a visit time, together with various factors. In fact, planning a travel is still very complicated or difficult to use software such as Excel and Notebook and separately map a place of interest. By using an algorithm based on travel optimization, when users only click on travel places they want to visit while traveling, they may receive fully optimized travel plans for generating the most efficient daily travel plan. Profitably, users may conveniently use the algorithm without pressure of using their computers and mobile devices.

PRIOR ART DOCUMENTS

Patent Documents

Korean Patent Laid-open Publication No. 10-2020-0064308 (Jun. 8, 2020)

SUMMARY

Aspects of the disclosure are to address at least the above-mentioned problems and/or disadvantages and to provide at least the advantages described below. Accordingly, an aspect of the disclosure is to provide a system for allowing a user to conveniently and quickly make a travel plan using an algorithm.

In accordance with an aspect of the disclosure, a server is provided. The server may include a database storing travel information provided from a first electronic device and local information provided from a second electronic device and a processor that generates a travel itinerary based on the travel information and the local information. The travel itinerary may include a travel schedule for each time zone in a travel day and time. The travel information may include information about a travel place, a travel day and time, transportation, and accommodations. The local information may include information about traffic in the travel place, accommodations in the travel place, a restaurant in the travel place, a landmark in the travel place, activity in the travel place, or news for the travel place.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
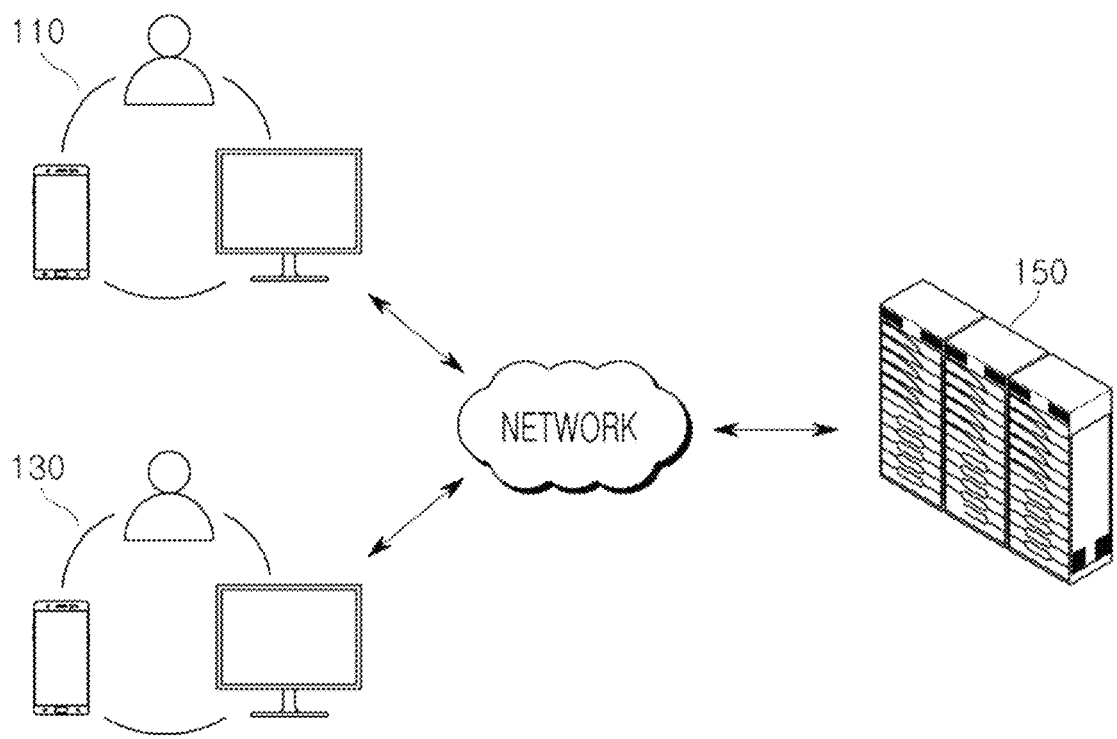
FIG. 1 is a drawing illustrating a system for optimizing a travel schedule according to an embodiment of the disclosure.

Hereinafter, various embodiments of the disclosure may be described with reference to accompanying drawings. However, it should be understood that the disclosure is not intended to be limited to a specific embodiment and includes various modifications, equivalents, and/or alternatives of embodiments of the disclosure. With regard to description of drawings, similar denotations may be used for similar components.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, without departing the scope of the disclosure, a first component may be referred to as a second component, and similarly, a second component may be referred to as a first component.

According to the situation, the expression "configured to" used in the disclosure may be used as, for example, the expression "suitable for", "having the capacity to", "designed to", "adapted to", "made to", or "capable of". The term "configured to" must not mean only "specifically designed to".

In the disclosure, for example, a "command", an "instruction", "control information", a "message", "information", "data", a "packet", a "data packet", "intent", and/or a "signal", transmitted and received between a first electronic device(s) and a second electronic device(s), may include the scope or a detailed electrical expression (e.g., a digital code/an analog physical quantity) capable of being recognized by humans or may refer to itself. It may be obvious to those skilled in the art to which the disclosure pertains that the listed exemplary expressions may be interpreted in various manners according to the used context. "A is greater than B" in the specification may include the meaning "A is greater than or equal to B" as well as the meaning "A is greater than B".

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

FIG. 1 is a drawing illustrating an environment in which a system for optimizing algorithm-based travel scheduling is implemented according to an embodiment of the disclosure.

As shown in FIG. 1, the system for optimizing the travel scheduling according to an embodiment of the disclosure may include a first electronic device 110, a second electronic device 130, and a server 150. The first electronic device 110 and the server 150 may be connected with each other over a network.

The first electronic device 110 may be a user terminal which wants to use a travel scheduling optimization service. For example, the first electronic device 110 may be a terminal which searches for a travel place or sets a travel day and time.

The first electronic device 110 may receive travel information for travel scheduling from a user. According to an embodiment of the disclosure, the user may input his or her travel information to be offered the entire travel itinerary and may simply and quickly schedule a travel. According to an embodiment of the disclosure, the travel information may include a minimum amount of information for travel scheduling, for example, a travel place, a travel day and time, transportation, and accommodations.

The travel place may include one or more countries, areas, landmarks, or the like. When there is a place the user wants to visit through a photo, but when the user does not know a name or location of the place, he or she may input the photo of the place by means of a user terminal.

The travel day and time may include information about a start date and an end date of travel the user wants and may include information about the entire travel period. Furthermore, the travel day and time may include information about a desired period of stay for each place the user wants. Furthermore, the travel date and time may include information about a desired travel time for each date. For example, the travel time may be time information from 9 a.m. to 1 p.m. every day.

The transportation may include information about a departure time of a flight or a means of transport in the place space, which is reserved by the user, an arrival time of the flight or the means of transport, a flight number of the flight, or a type of the means of transport.

The accommodations may include information about a name, a type, a reserved day and time, or the like of the accommodations reserved by the user.

The user may input all or some of information about the travel place, the travel day and time, the transportation, and the accommodations using the first electronic device 110.

The first electronic device 110 may transmit the input travel information to the server 150.

The first electronic device 110 may receive a travel itinerary from the server 150. The travel itinerary may be generated based on the travel information input from the user and may include a schedule for each time zone of the travel day and time.

The travel itinerary may include a visit itinerary of the travel place. When the travel place is plural in number, the travel itinerary may include an order where the travel places are visited. The travel itinerary may include a recommended area other than the travel place input by the user.

The travel itinerary may include a travel schedule for each day. The travel schedule for each day may include a visit place, a restaurant, leisure, or the like for each time zone in a travel time of day. According to an embodiment of the disclosure, the travel itinerary may include, but is not limited to, only a visit date of the travel place, and may include all of schedules for each time zone of a specific date.

The travel itinerary may include information about the transportation. For example, the travel itinerary may include information about a flight number, a flight itinerary, and costs of an airplane. Furthermore, the travel itinerary may include information about a means of transport to a next schedule after the airplane lands. For example, the travel itinerary may include an itinerary of a bus, a train, a subway, or the like from an airport to accommodations and a place and a method for purchasing a boarding pass.

The travel itinerary may include information about a restaurant capable of being visited at each travel place. The information about the restaurant may include a location, a menu, a price, evaluations of other users, or the like.

The travel itinerary may include recent news of the travel place input from the user. For example, the travel itinerary may include an incident and an accident which occur in the travel place. In addition, the travel itinerary may include a safety precaution in the travel place.

The travel itinerary may include information about costs expected to be incurred while traveling.

The first electronic device 110 may display the travel itinerary to the user.

The first electronic device 110 may request the user to provide a response to whether he or she has an intention to correct the travel itinerary. In other words, the first electronic device 110 may identify satisfaction of the user with the generated travel itinerary. When the user responds that he or she has the intention to correct the generated travel itinerary when the satisfaction is less than a criterion, the first electronic device 110 may receive additional information from the user. When the user responds that he or she has the intention to correct the travel itinerary, but when he or she does not input additional information, the first electronic device 110 may transmit a message indicating that the additional information is not input to the server 150.

The additional information may include information about at least one of a budget expected to be incurred while traveling, the desired concept of travel, desired transportation, a preferred food, or a weight for each item included in the additional information.

The budget may be necessary expenses expected while traveling, which may be input as the total cost, but may be input by being divided into transportation expenses, lodging expenses, food expenses, and the like.

The concept of travel may be the concept of travel the user prefers, which may include at least one of rest, sightseeing, activity, and shopping. For example, when the user prefers to stay in a resort or the like, he or she may input rest as the concept of travel. Furthermore, when the user prefers sightseeing of a landmark, a museum, or the like in the travel place, he or she may input sightseeing as the concept of travel. Furthermore, when the user prefers activities of leisure or the like in the travel place, he or she may input activity as the concept of travel. Furthermore, when the user focuses on shopping in the travel place, he or she may input shopping as the concept of travel.

The transportation may be a means of transport, which may include an airplane, a ship, a subway, and a vehicle. Furthermore, the transportation may include information about direct flight or stopover. In an example, the user may prefer a flight, particularly, a direct flight, and such information may be input to the first electronic device 110 as additional information.

According to an embodiment of the disclosure, a travel itinerary may be quickly and conveniently provided by receiving only a minimum amount of information from the user and scheduling the travel itinerary, and a user-optimized travel itinerary may be scheduled by receiving additional information from the user under certain circumstances.

The first electronic device 110 may receive change information from the user. The change information may be at least one of items included in the above-mentioned travel information and the above-mentioned additional information. The change information may be input before the travel starts or while traveling. In other words, when a travel period is changed before the user departs for travel, or when the user wants to stay longer than a plan in a specific area while traveling, he or she may input change information. Furthermore, when the user wants to add/delete one or more of travel destinations before or during travel, he or she may input change information.

In an example, the change information may include at least one piece of information below.

Add a new travel place
Delete a travel place
Change a start time of travel for each date (e.g., 9 a.m. to 1 p.m.)
Delete a date
Add a date The change information above is only an embodiment, but not limited thereto.

The first electronic device 110 may transmit the change information to the server 150. Furthermore, the first electronic device 110 may display the travel itinerary corrected based on the change information to the user.

The second electronic device 130 may be a terminal of a travel-related service provider. For example, the second electronic device 130 may be a terminal of a transportation service provider, which may be a terminal which provides the server 150 with information about a means of transport. The information about the means of transport may include a means of transport (e.g., an airplane, a ship, a subway, a vehicle, or the like), a departure/arrival time, or the like. For another example, the second electronic device 130 may be a terminal of an accommodation service provider, which may be a terminal which provides the server 150 with information about accommodations. The information about the accommodations may include a type of the accommodations, a location of the accommodations, a feature of the accommodations, reviews of users of the accommodations, or the like. For another example, the second electronic device 130 may be a terminal of a service provider which manages a landmark, which may be a terminal which provides the server 150 with information about an operating time, a location, or the like of the landmark. For another example, the second electronic device 130 may be a terminal of a restaurant, which may be a terminal which provides the server 150 with information about a menu, an operating time, a location, or the like of the restaurant. For another example, the second electronic device 130 may be a terminal of a service provider which monitors a weather of the travel place, which may be a terminal which provides the server 150 with information about current weather, daily/daytime weather, or the like of the travel place. In addition, the second electronic device 130 may be a terminal of each of all service providers associated with travel.

The second electronic device 130 may provide the server 150 with local information. The local information according to an embodiment of the disclosure may include all pieces of information the user may experience while traveling, for example, information about traffic, accommodations, a restaurant, a landmark, activity, or news of the travel place. The information about the traffic of the travel place may include information about transportation, a real-time traffic situation, or the like of the travel place. The information about the accommodations of the travel place may include information about a location of the accommodations, a feature of the accommodations, whether the accommodations are available, or the like. The information about the restaurant of the travel place may include information about a location, a menu, an operating time, a user's review, or the like of the restaurant. The information about the landmark of the travel place may include information about a location, an operating time, an entrance fee, a user's review, or the like of the landmark. The information about the news of the travel place may include information about recent news of the travel place, news which will occur during a travel period, or the like.

Each of the first electronic device 110 and the second electronic device 130 may be implemented as a computer capable of accessing a server or terminal of a remote place over a network. For example, the computer may include a notebook, a desktop, a laptop, or the like loaded with a web browser. Furthermore, each of the first electronic device 110 and the second electronic device 130 may be implemented as a terminal capable of accessing a server or terminal of a remote place over a network. For example, each of the first electronic device 110 and the second electronic device 130 may be a wireless communication device ensuring portability and mobility, which may include all types of handheld wireless communication devices, such as a navigation, a personal communication system (PCS), a global system for mobile communication (GSM), a personal digital cellular (PDC), a personal handyphone system (PHS), a personal digital assistant (PDA), an international mobile telecommunication (IMT)-2000 terminal, a code division multiple access (CDMA)-2000 terminal, a wideband-code division multiple access (W-CDMA) terminal, a wireless broadband Internet (Wibro) terminal, a smartphone, a smartpad, and a tablet personal computer (PC).

The server 150 may generate a travel itinerary based on information received from the first electronic device 110 and the second electronic device 130 and previously stored information and may provide the first electronic device 110 with the generated travel itinerary. The travel itinerary may be generated based on the travel information provided from the first electronic device 110 and the local information provided from the second electronic device 130 and may be corrected based on at least one of the additional information and the change information received from the first electronic device 110. The travel itinerary may include a travel schedule for each time zone in a travel day and time. In an example, the travel schedule for each time zone may include information about at least one of a museum located in the travel place, a landmark located in the travel place, a restaurant located in the travel place, activity of the travel place, and a means of transport of the travel place.

To generate or correct to the travel itinerary, the server 150 may generate or correct the travel itinerary using big data and artificial intelligence (AI) as well as the travel information provided from the first electronic device 110 and the local information provided from the second electronic device 130. For example, the server 150 may refer to information published in a travel guidebook, a travel block, an online encyclopedia, a search engine, a media sharing site, or the like to generate the travel itinerary.

The server 150 may receive travel information from the first electronic device 110. The travel information may include information about a travel place and a travel day and time. The travel information may include information about a plurality of travel places.

The travel information should not include travel places during a total travel period, but may fail to include a travel place for some travel periods. In this case, the server 150 may determine a recommended place suitable for a travel period when a travel place is not specified. In an example, the server 150 may determine a recommended place with regard to a location of a travel place input from the user, a movement route to a next travel place, a travel place which is recently popular to travelers, or the like.

The travel information may include information about whether the user books transportation, that is, whether at least some of travel places and a portion of a travel day and time are already determined. When some of the travel places and a portion of the travel day and time are already determined, the server 150 may generate recommended information with regard to the determined travel place and the determined travel period. In other words, the server 150 may fail to adjust the determined travel place and the determined travel period.

The travel place may be represented as one or more countries, areas, landmarks, or the like. When there are two or more travel places, the server 150 may determine the most suitable visit order of the travel places. In detail, the server 150 may determine an order where the travel places are visited, with regard to a location of each travel place, an average period of stay in each travel place, weather in the period of stay in each travel place, a means of transport between the travel places, a time zone of the means of transport, a time crowded with travelers in each travel place, or whether a landmark and a convenience of each travel place are open at a corresponding date.

Meanwhile, the travel place may be received in the form of a photo or the like. In this case, the server 150 may recognize the travel place by performing comparison and analysis with previously stored photos using its image analysis system.

The travel day and time may be the entire period of travel the user wants. Furthermore, the travel day and time may be a desired period of stay or a desired time of stay for each place the user wants to visit. The information about the travel day and time may include a travel start date and a travel end date.

When it is determined that it is difficult to visit all of travel places input from the user during a travel day and time input from the user, the server 150 may generate a message indicating that it is difficult to visit all the travel places during the period. In this case, the server 150 may generate a message requesting the user to correct some of basic information, and the server 150 may self-correct some of the basic information to generate a travel itinerary.

The server 150 may determine the travel itinerary based on at least one of a visitable time of the travel place, the busiest time of the travel place, an average time of stay of the travel place, weather of the travel place, traffic of the travel place, or a location of the travel place.

The server 150 may correct the travel itinerary based on the additional information received from the first electronic device 110. The additional information may include information about at least one of a budget expected to be incurred while traveling, the desired concept of travel, desired transportation, a preferred food, or a weight for each item included in the additional information.

In an example, the server 150 may correct the travel itinerary based on a budget input from the user. Furthermore, the server 150 may correct the travel itinerary based on the concept of travel. The concept of travel may be the concept of travel the user prefers, which may include at least one of rest, sightseeing, activity, and shopping.

The server 150 may correct the travel itinerary by combining the concept of travel in a suitable manner depending on a weight input via the first electronic device 110.

When the user does not input additional information, the server 150 may receive a message indicating that the additional information is not input. In this case, the server 150 may correct the travel itinerary in additional consideration of travel information or the like of other travelers.

The travel itinerary may include a visit itinerary of the travel place. The travel itinerary may include a recommended area other than the travel place input by the user.

The travel itinerary may include a travel schedule for each day. The travel schedule for each day may include a visit place, a mealtime, or the like for each time zone in a travel time of day. In other words, the travel itinerary may simply include, but is not limited to, only a visit date of the travel place, and may include all of schedules for each time zone of a specific date.

The travel itinerary may include information about the transportation. For example, the travel itinerary may include information about a flight number, a flight itinerary, or costs of an airplane. Furthermore, the travel itinerary may include information about a means of transport to a next schedule after the airplane lands. For example, the travel itinerary may include an itinerary of a bus, a train, a subway, or the like from an airport to accommodations and a place and a method for purchasing a boarding pass.

The travel itinerary may include information about a restaurant capable of being visited in each travel place. The information about the restaurant may include a location of the restaurant, a menu of the restaurant, a price of the restaurant, evaluations of other users of the restaurant, or the like.

The travel itinerary may include recent news of the travel place input from the user. For example, the travel itinerary may include an incident and an accident which occur in the travel place. In addition, the travel itinerary may include a safety precaution in the travel place.

The server 150 may receive change information from the first electronic device 110. The change information may be at least one of items included in the above-mentioned basic information and the above-mentioned additional information. The change information may be input before travel starts or during travel. For example, when a travel period is changed before the user departs for travel, or when the user wants to stay longer than a plan in a specific area while traveling, he or she may input change information. Furthermore, when the user wants to add/delete one or more of travel destinations before or during travel, he or she may input change information.

In an example, the change information may include at least one piece of information below.

Add a new travel place
Delete a travel place
Change a start time of travel for each date (e.g., 9 a.m. to 1 p.m.)
Delete a date
Add a date The change information above is only an embodiment, but not limited thereto.

The server 150 may correct the travel itinerary based on the change information.

In an example, the user may add a travel place by inputting change information. When it is determined that there are too many travel places to be visited during a predetermined period, the server 150 may transmit a message indicating that it is difficult to visit all travel places to the first electronic device 110. In this case, the first electronic device 110 may display the message, "open but not possible", to the user. In addition, the first electronic device 110 may display a travel place determined as being impossible to visit to the user and may request the user to select to delete the travel place or move the travel place to another travel place. In addition, the server 150 may generate a travel itinerary in which the travel place determined as being impossible to visit is replaced or deleted.

The server 150 may store all of contents, records, and the like of data transmitted and received with the first electronic device 110 and the second electronic device 130. Furthermore, the server 150 may store all pieces of information necessary to generate and correct a travel itinerary among a plurality of pieces of information which are not input from the user. For example, the server 150 may store recent news of a travel place input by the user, evaluation of other travelers for each travel place, traffic information, or the like.

Figure 2:
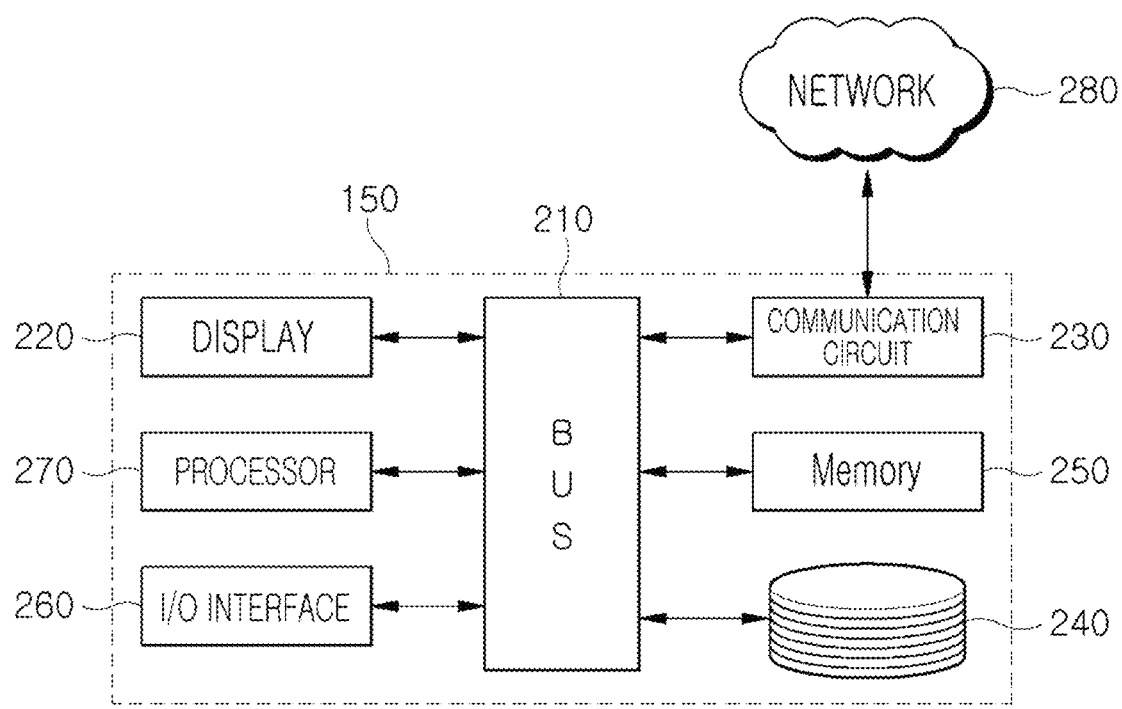
FIG. 2 is a drawing illustrating a configuration of a server according to an embodiment of the disclosure.

FIG. 2 is a drawing illustrating a configuration of a server 150 according to an embodiment of the disclosure.

Referring to FIG. 2, the server 150 according to an embodiment of the disclosure may include a bus 210, a display 220, a communication circuitry 230, a database 240, a memory 250, an input/output (I/O) interface 260, and a processor 270. In another embodiment, the server 150 may exclude at least one of the components or may additionally include another component.

The bus 210 may electrically connect the components 220 to 270. The bus 210 may include a circuit for communication (e.g., a control message and/or data) between the components 220 to 270.

The display 220 may display a text, an image, a video, an icon, a symbol, or the like configuring a variety of content. The display 220 may include a touch screen and may receive a touch, a gesture, proximity, or a hovering input using an electronic pen or a part of the user's body.

For example, the display 220 may include a liquid crystal display (LCD), a light emitting diode (LED) display, an organic LED display, a microelectromechanical systems (MEMS) display, an electronic paper display. The display 220 may be implemented to be included in the server 150 or may be implemented independently of the server 150 to be operatively connected to the server 150.

The communication circuitry 230 may establish a communication channel with external devices (e.g., a purchaser electronic device 110 and a seller electronic device 130) with the server 150. For example, the communication circuitry 230 may access a network 280 through wireless communication or wired communication to communicate with the external devices. The communication circuitry 230 may receive travel information for travel scheduling from the first electronic device 110. The communication circuitry 230 may receive additional information from the first electronic device 110. The communication circuitry 230 may receive change information from the first electronic device 110. The communication circuitry 230 may transmit a travel itinerary to the first electronic device 110.

The network 280 may correspond to a network shown in FIG. 1. The network 280 may include at least one of a telecommunications network, a computer network, the Internet, or a telephone network. A wireless communication protocol for accessing the network 280 may use at least one of, for example, long-term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or a 5th G (5G) standard communication protocol.

The database 240 may be implemented on the memory 250 or may be implemented on a separate storage medium. The database 240 may store all of contents, records, and the like of data transmitted and received with the first electronic device 110 and the second electronic device 130. Furthermore, the database 240 may store all pieces of information necessary to generate and correct a travel itinerary among a plurality of pieces of information which are not input from the user. For example, the database 240 may store recent news of a travel place input by the user, evaluation of other travelers for each travel place, traffic information, or the like. Furthermore, the database 240 may store various data used to implement the disclosure, for example, information about a travel place or information about each of accommodations, a restaurant, weather, a traffic situation, and a means of transport. According to various embodiments, because the data stored in the database 240 is information sensitive to customers, it is distributed and stored in a blockchain network to improve security about use of the information. When the database 240 is distributed and stored in the blockchain network, a history of transmitting, modifying, deleting, or adding information included in the database 240 may be more securely managed in the blockchain network.

The memory 250 may include a volatile and/or non-volatile memory. The memory 250 may store a command or data associated with at least one other component of the server 150. For example, the memory 250 may store instructions, when executed, causing the processor 270 to perform various operations described in the specification. As an example, the instructions may be included in a package file of an application program.

The I/O interface 260 may play a role in delivering a command or data, input from a user or another external device, to another component of the server 150. The I/O interface 260 may be implemented with hardware or software and may be used as the concept including a user interface (UI) and a port for communication with another external device.

The processor 270 may include at least one or more of a central processing unit (CPU), an application processor (AP), or a communication processor (CP). The processor 270 may be electrically connected with the memory 250, the display 220, and the communication circuitry 230 through the bus 210 and may execute calculation or data processing about control and/or communication of other components depending on instructions, a program, or software stored in the memory 250, during an operation. Thus, the execution of the instructions, the application program, or the software may be understood as an operation of the processor 270.

Operations of the processor 270 may be a representative example, and the technical scope of the disclosure is not limited thereto. For example, an operation of the "server 150" described directly and indirectly in the specification may be understood as an operation of the processor 270 included in the "server 150". In addition, it may be obvious to those skilled in the art that at least some of operations performed in the server 150 may be performed by a third device through a server-client architecture, cloud computing, parallel computing, and/or the like.

The processor 270 may generate a travel itinerary based on information received from the first electronic device 110 and previously stored information. The processor 270 may generate a travel itinerary based on basic information. The processor 270 may correct the travel itinerary based on additional information. The processor 270 may correct the travel itinerary based on change information.

Hereinafter, a description will be given of various embodiments of the disclosure implemented in an environment including the above separate entity.

Figure 3:
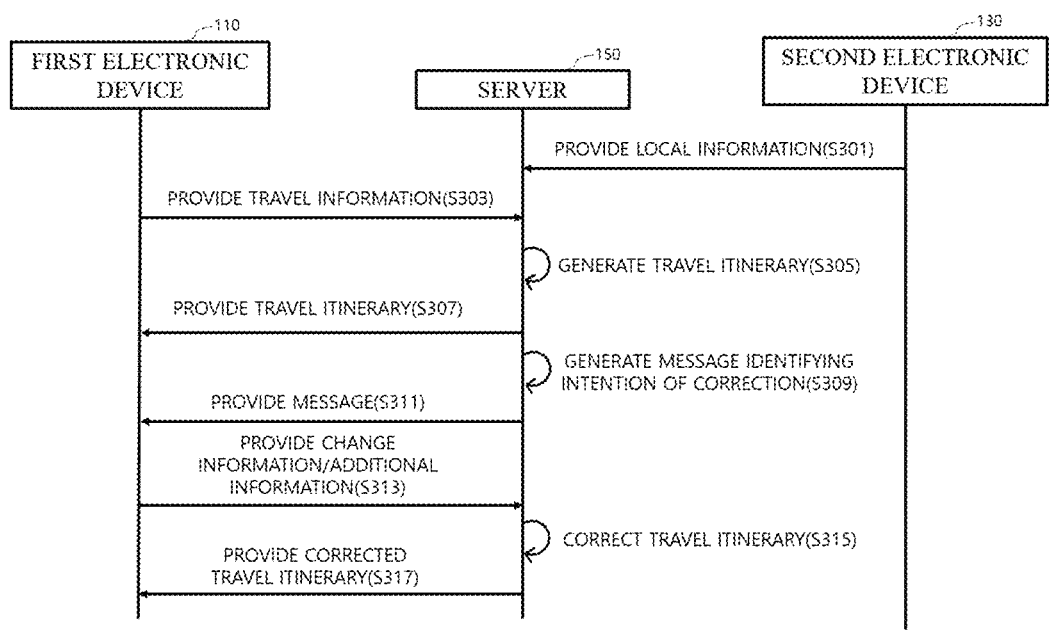
FIG. 3 is a sequence chart illustrating an operation of a first electronic device, a second electronic device, and a server according to an embodiment of the disclosure.

FIG. 3 is a sequence chart illustrating an operation of a first electronic device 110, a second electronic device 130, and a server 150 according to an embodiment of the disclosure.

In operation S301, the second electronic device 130 may provide the server 150 with local information.

In operation S303, the first electronic device 110 may provide the server 150 with travel information. For example, the server 150 may receive information about a travel place and a travel day and time from the first electronic device 110. The server 150 may receive a plurality of travel places.

In operation S305, the server 150 may generate a travel itinerary based on the travel information provided from the first electronic device 110 and the local information provided from the second electronic device 130. For example, the server 150 may generate a travel itinerary for visiting the travel place based on the information about the travel place and the travel day and time. The travel itinerary may include a travel schedule for each time zone in the travel day and time. The server 150 may determine an order where the plurality of travel places are visited. The travel itinerary may be determined based on at least one of a visitable time of the travel place, the busiest time of the travel place, an average time of stay of the travel place, weather of the travel place, traffic of the travel place, or a location of the travel place. The travel schedule for each time zone may include information about at least one of a museum located in the travel place, a landmark located in the travel place, a restaurant located in the travel place, activity of the travel place, and a means of transport of the travel place.

In operation S307, the server 150 may provide the first electronic device 110 with the travel itinerary generated in operation S305. For example, the server 150 may transmit the travel itinerary for visiting the travel place to a user terminal. The travel itinerary may include recent news generated in the travel place.

In operation S309, the server 150 may generate a message requesting the user to provide a response to whether he or she has an intention to correct the generated travel itinerary.

In operation S311, the server 150 may provide the first electronic device 110 with the message generated in operation S309.

When the user responds that he or she has the intention to correct the travel itinerary, in operation S313, the first electronic device 110 may provide the server 150 with change information and additional information, which are input by the user. The additional information may include at least one of information about a budget, the concept of travel, transportation, a preferred food, and a weight for each item included in the additional information. The change information may include information about at least one of a change in travel place, a change in start time of travel for each travel day and time, or a change in travel day and time.

In operation S315, the server 150 may correct the travel itinerary by reflecting at least one of the change information and the additional information provided from the first electronic device 110.

In operation S317, the server 150 may provide the first electronic device 110 with the corrected travel itinerary.

FIGS. 4A to 4G are drawings illustrating contents displayed on a display of a first electronic device 110 according to an embodiment of the disclosure.

Figure 4A:
FIGS. 4A, 4B, 4C, 4D, 4E, 4F, and 4G are drawings illustrating contents displayed on a display of a first electronic device according to an embodiment of the disclosure.

Referring to FIG. 4A, a user may select a travel place as shown in FIG. 4A. According to an embodiment of the disclosure, the user may separately search for a city he or she wants to travel around.

Figure 4B:
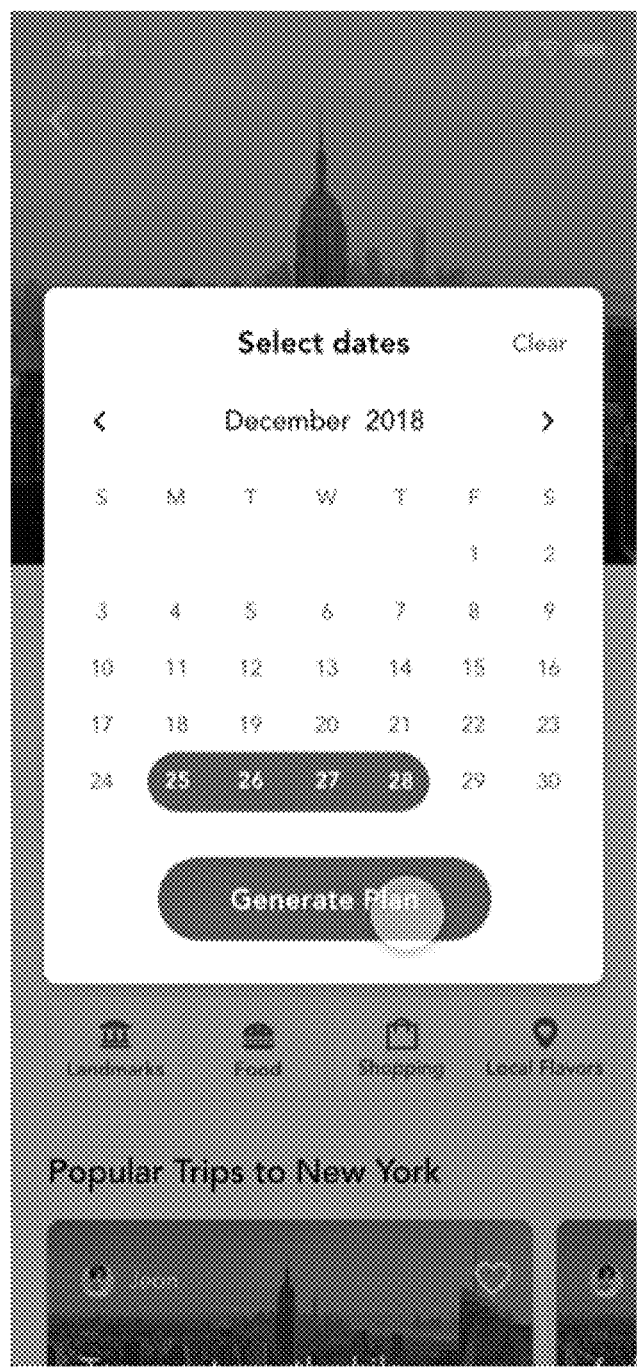

Referring to FIG. 4B, a user may select a travel day and time and a travel period as shown in FIG. 4B. According to an embodiment of the disclosure, the user may separately search for a city he or she wants to travel around. After selecting the travel day and time, the user may click on a 'Generate plan' object to generate a travel itinerary. According to an embodiment of the disclosure, as the user clicks on the 'Generate plan' object, a first electronic device 110 may provide a server 150 with travel information, and the server 150 may generate a travel itinerary based on local information provided from a second electronic device 130 and the travel information provided from the first electronic device 110.

Figure 4C:
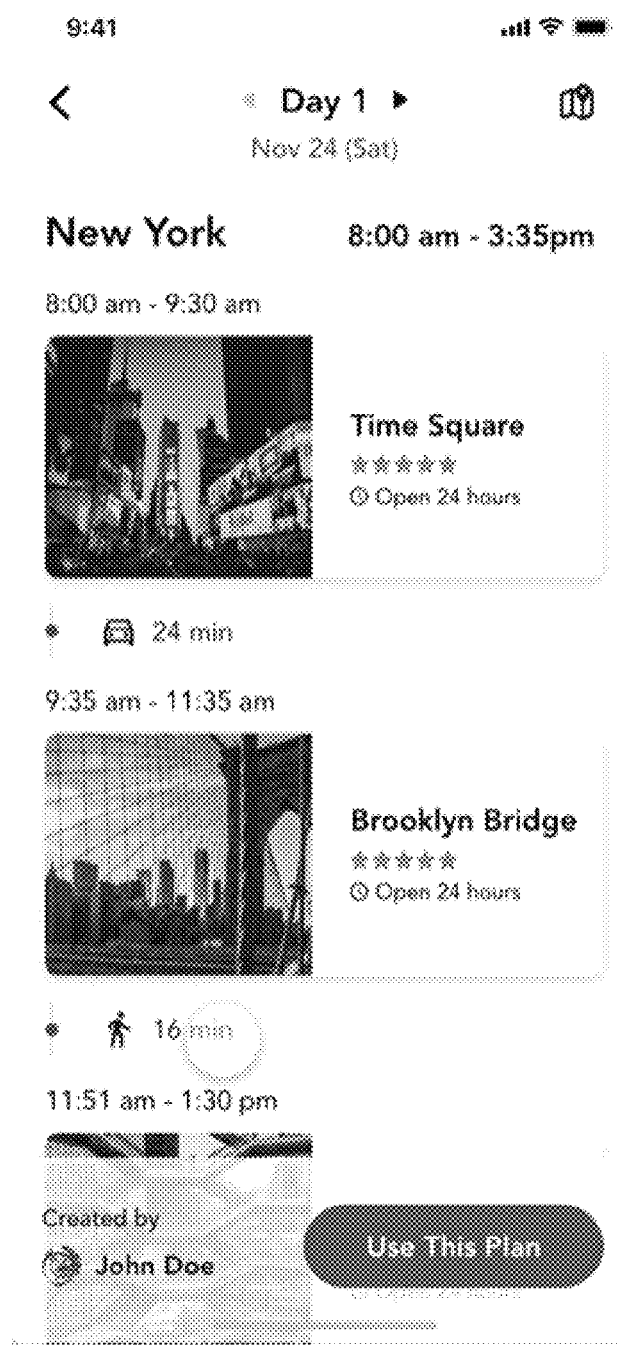

Referring to FIG. 4C, the user may identify the travel itinerary provided from the server 150 using the first electronic device 110. The travel itinerary may include information about a travel city, a travel day and time, a travel start time, a travel place, a time of stay, a middle movement time, transportation, or the like.

Figure 4D:
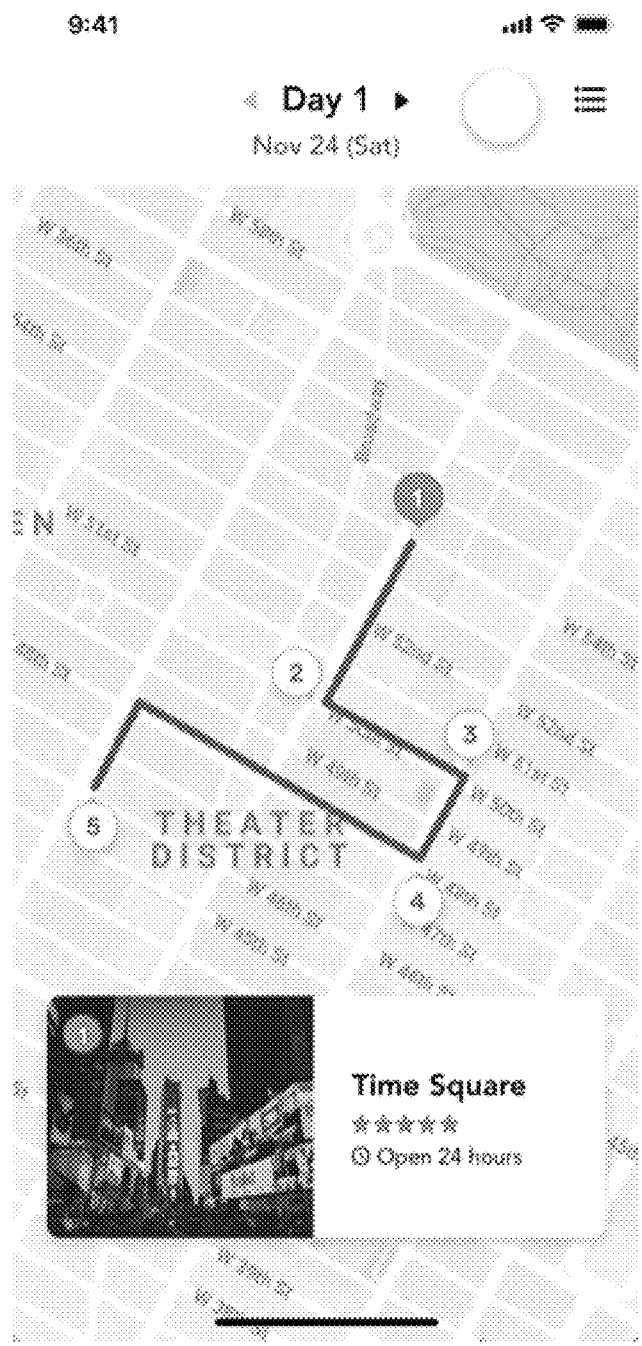

Referring to FIG. 4D, the user may identify a route of the travel itinerary provided from the server 150. Referring to FIG. 4D, a plurality of travel places may be listed in an order of No. 1 to No. 5. If the user wants, he or she may correct the listed order.

Figure 4E:
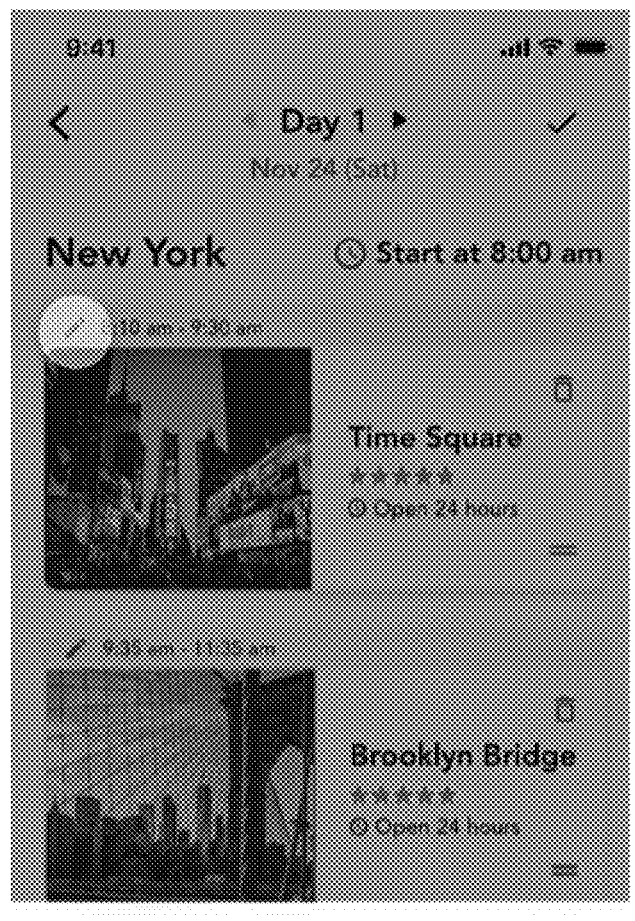
Figure 4F:
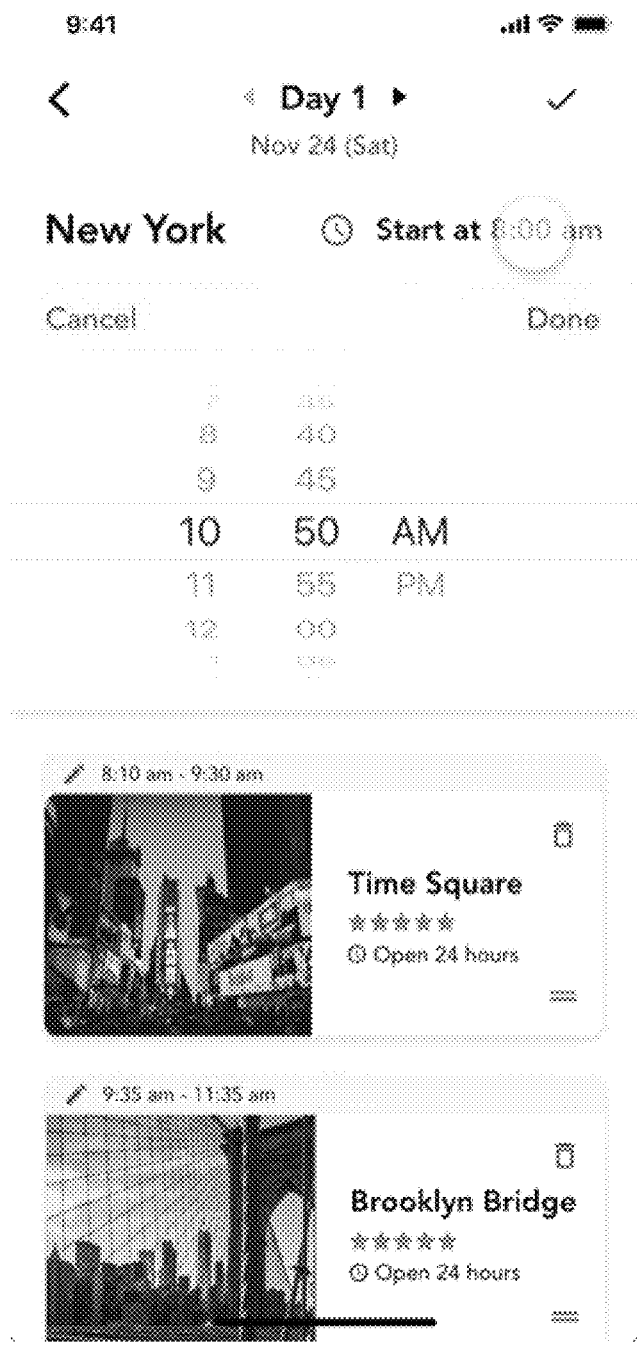

Referring to FIG. 4E, the user may change a travel start time. Furthermore, referring to FIG. 4F, the user may change a time when he or she stays in a specific travel place. The server 150 may receive a change item input by the user, that is, change information, to correct the travel itinerary. The server 150 may provide the first electronic device 110 with the corrected travel itinerary, and the user may identify the corrected travel itinerary using the first electronic device 110.

Figure 4G:
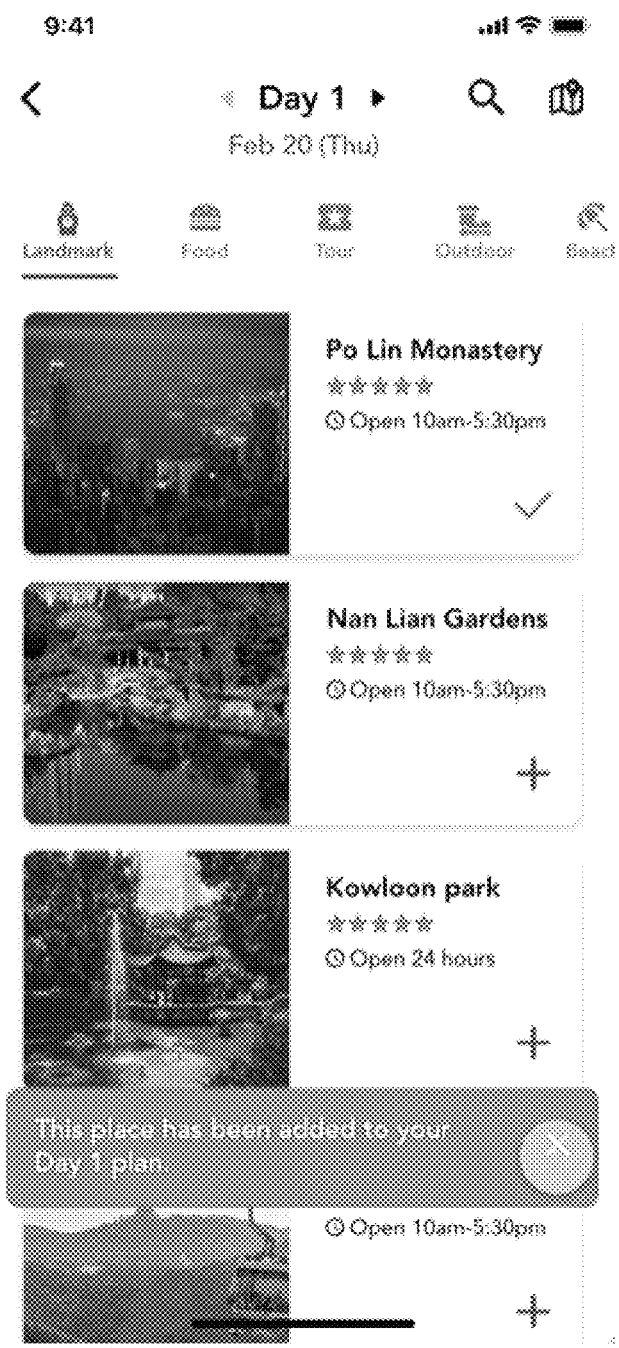

Referring to FIG. 4G, the user may separately select a desired travel place other than the travel place included in the travel itinerary provided from the server 150. When the user selects the desired travel place, the first electronic device 110 may provide the server 150 with the travel place selected by the user, and the server 150 may correct the travel itinerary by reflecting the transmitted travel place.

As such, the server 150 according to an embodiment of the disclosure may receive only a minimum amount of information from the user and may schedule the travel itinerary to quickly and conveniently provide the travel itinerary and may receive additional information from the user under certain circumstances and may provide a user-optimized travel itinerary.

Figure 5:
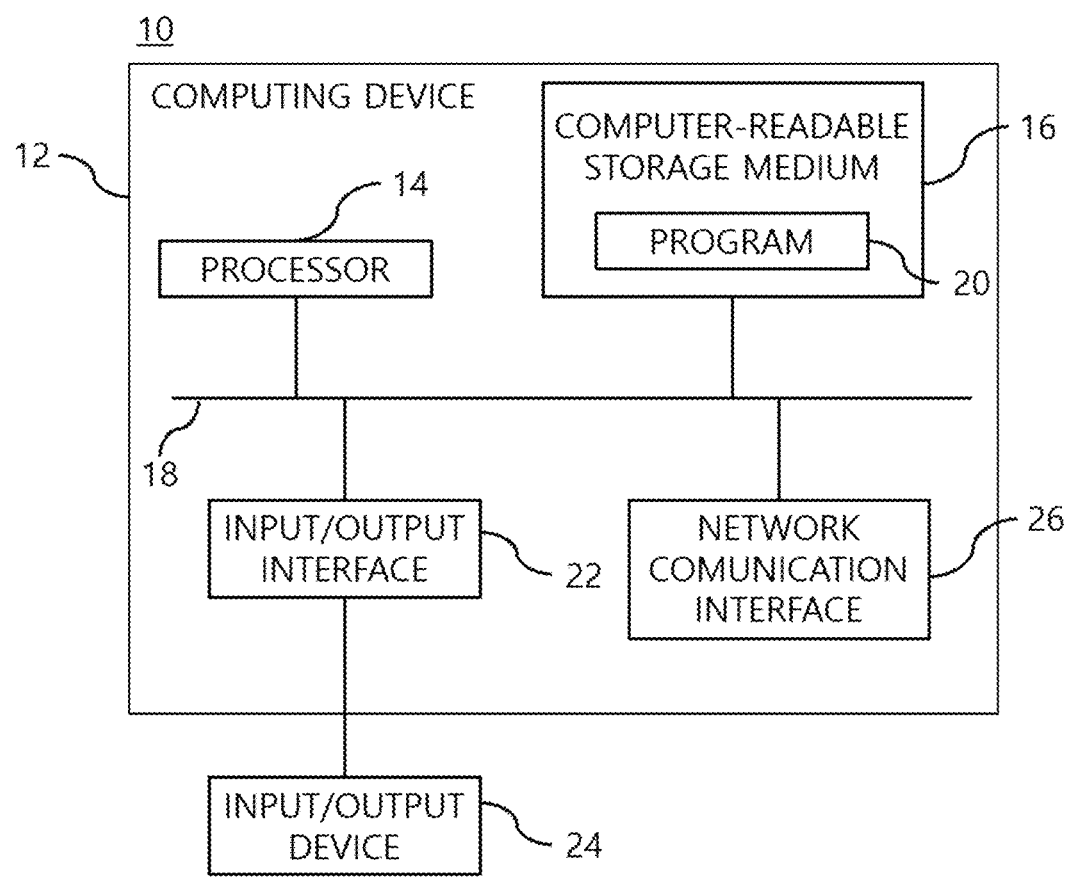
FIG. 5 is a block diagram illustrating a computing environment including a computing device suitable for use according to exemplary embodiments.

FIG. 5 is a block diagram illustrating a computing environment 10 including a computing device suitable for use according to exemplary embodiments. In the shown embodiment, each component may have a different function and capability from that described below, and may include an additional component other than that described below.

The shown computing environment 10 may include a computing device 12. In an embodiment, the computing device 12 may be a first electronic device 110, a second electronic device 130, or a server 150.

The computing device 12 may include at least one processor 14, a computer-readable storage medium 16, and a communication bus 18. The processor 14 may cause the computing device 12 to operate according to the exemplary embodiment described above. For example, the processor 14 may execute one or more programs stored in the computer-readable storage medium 16. The one or more programs may include one or more computer-executable instructions, and the computer-executable instructions may be configured to, when executed by the processor 14, cause the computing device 12 to perform operations according to an exemplary embodiment.

The computer-readable storage medium 16 may be configured to store computer-executable instructions, a computer-executable program code, program data, and/or another suitable type of information. A program 20 stored in the computer-readable storage medium 16 may include a set of instructions executable by the processor 14. In an embodiment, the computer-readable storage medium 16 may be a memory (a volatile memory such as a random access memory (RAM), a non-volatile memory, or a suitable combination thereof), one or more magnetic disc storage devices, optical disc storage devices, flash memory devices, other types of storage media capable of being accessed by the computing device 12 and storing desired information, or a suitable combination thereof.

The communication bus 18 may interconnect various other components of the computing device 12, including the processor 14 and the computer-readable storage medium 16.

Furthermore, the computing device 12 may include one or more input/output interfaces 22 for providing an interface for one or more input/output devices 24 and one or more network communication interfaces 26. The input/output interface 22 and the network communication interface 26 may be connected to the communication bus 18. The input/output device 24 may be connected to other components of the computing device 12 through the input/output interface 22. The exemplary input/output device 24 may include an input device, such as a pointing device (a mouse, a track pad, or the like), a keyboard, a touch input device (a touch pad, a touch screen, or the like), a voice or sound input device, various types of sensor devices, and/or an image capture device, and/or an output device, such as a display device, a printer, a speaker, and/or a network card. The exemplary input/output device 24 may be one component constituting the computing device 12 to be included in the computing device 12 and may be a separate device independent of the computing device 12 to be connected with the computing device 12.

According to an embodiment of the disclosure, the travel itinerary may be quickly and conveniently provided by receiving only a minimum amount of information from the user and scheduling the travel itinerary, and the user-optimized travel itinerary may be scheduled by receiving additional information from the user under certain circumstances.

While the disclosure has been shown and described with reference to various embodiments thereof, it will be understood by those skilled in the art that various changes in form and details may be made therein without departing from the spirit and scope of the disclosure. Therefore, the claims of the disclosure should not be limited and determined to the described embodiment and should be defined by the appended claims and their equivalents.

What is claimed is:

1. A system for optimizing a travel schedule, comprising:
a first electronic device which includes a display and an input device wherein the first electronic device receives travel information from a user through the input device;
a second electronic device which stores local information; and
a server which includes a database and a processor wherein the first electronic device and the server are connected to each other via a network, wherein the second electronic device and the server are connected to each other via the network, wherein the database stores the travel information received from the first electronic device via the network and the local information received from the second electronic device via the network,
wherein the server stores photos and includes an image analysis system,
wherein the processor is configured to generate a travel itinerary based on the travel information and the local information, and the travel itinerary is transmitted to the first electronic device and displayed on the display of the first electronic device,
wherein the travel information includes information about a travel place, a travel day and time, transportation, and accommodations, wherein the accommodations include a name and a reserved day and time,
wherein the local information includes information about traffic in the travel place, accommodations in the travel place, a restaurant in the travel place, a landmark in the travel place, activity in the travel place, and news for the travel place, wherein the traffic in the travel place includes a real-time traffic situation,
wherein the processor is configured to receive a photo instead of the travel place from the first electronic device via the network, and the server generates the travel place associated with the photo by analyzing the photo and comparing the photo with the photos stored in the server using the image analysis system,
wherein the processor is configured to generate a message requesting a response on the user's intention to correct the generated travel itinerary wherein the message is transmitted to the first electronic device and displayed on the display of the first electronic device,
wherein the first electronic device is configured to receive additional information from the user through the input device and the server is configured to receive the additional information from the first electronic device via the network, wherein the processor is configured to correct the travel itinerary based on the additional information and transmit the corrected travel itinerary to the first electronic device to be displayed on the display of the first electronic device, and wherein the additional information includes information about a budget, the concept of travel, transportation, a preferred food, and a weight for each item included in the additional information, wherein the concept of travel is configured to be selected from a list which comprises rest, sightseeing, activity, and shopping, wherein the processor is configured to correct the travel itinerary based on change information provided from the first electronic device and transmit the corrected travel itinerary to the first electronic device to be displayed on the display of the first electronic device, wherein the change information includes information about a change in travel place, a change in start time of travel for each travel day and time, and a change in travel day and time.

2. The system of claim 1, wherein the processor is configured to determine an order where a plurality of travel places are visited.

3. The system of claim 1, wherein the travel itinerary is determined based on at least one of a visitable time of the travel place, the busiest time of the travel place, an average time of stay of the travel place, weather of the travel place, traffic of the travel place, or a location of the travel place.

4. The system of claim 1, wherein the travel itinerary includes information about at least one of a museum located in the travel place, a landmark located in the travel place, a restaurant located in the travel place, activity of the travel place, and a means of transport of the travel place.

5. The system of claim 1, wherein the travel itinerary includes recent news generated in the travel place.

6. An operation method of a system for optimizing a travel schedule, the operation method comprising:

a server receiving travel information from a first electronic device wherein the server includes a database and a processor, the first electronic device includes a display and an input device, the server and the first electronic device is connected to each other via a network, the first electronic device receives the travel information from a user through the input device, and the travel information received form the first electronic device is saved in the database;

the server receiving local information from a second electronic device wherein the second electronic device stores the local information, the second electronic device and the server are connected to each other via the network, and the local information received from the second electronic device is saved in the database; and the server generating a travel itinerary based on the travel information and the local information, and the travel itinerary is transmitted to the first electronic device and displayed on the display of the first electronic device, wherein the server stores photos and includes an image analysis system, wherein the travel information includes information about a travel place, a travel day and time, transportation, and accommodations, wherein the accommodations include a name and a reserved day and time, wherein the local information includes information about traffic for the travel information, accommodations for the travel information, a restaurant for the travel information, a landmark for the travel information, or activity for the travel information, wherein the traffic in the travel place includes a real-time traffic situation, wherein the processor is configured to receive a photo instead of the travel place from the first electronic device via the network, and the server generates the travel place associated with the photo by analyzing the photo and comparing the photo with the photos stored in the server using the image analysis system, wherein the processor is configured to generate a message requesting a response on the user's intention to correct the generated travel itinerary wherein the message is transmitted to the first electronic device and displayed on the display of the first electronic device, wherein the first electronic device is configured to receive additional information from the user through the input device and the server is configured to receive the additional information from the first electronic device via the network, wherein the processor is configured to correct the travel itinerary based on the additional information and transmit the corrected travel itinerary to the first electronic device to be displayed on the display of the first electronic device, and wherein the additional information includes information about a budget, the concept of travel, transportation, a preferred food, and a weight for each item included in the additional information, wherein the concept of travel is configured to be selected from a list which comprises rest, sightseeing, activity, and shopping, wherein the processor is configured to correct the travel itinerary based on change information provided from the first electronic device and transmit corrected the travel itinerary to the first electronic device to be displayed on the display of the first electronic device, wherein the change information includes information about a change in travel place, a change in start time of travel for each travel day and time, and a change in travel day and time.

7. The operation method of claim 6, further comprising: determining an order where a plurality of travel places included in the travel itinerary are visited.

8. The operation method of claim 6, wherein the generating of the travel itinerary includes:

generating the travel itinerary based on at least one of a visitable time of the travel place, the busiest time of the travel place, an average time of stay of the travel place, weather of the travel place, traffic of the travel place, or a location of the travel place.

9. The operation method of claim 6, wherein the travel itinerary includes information about at least one of a museum located in the travel place, a landmark located in the travel place, a restaurant located in the travel place, activity of the travel place, and a means of transport of the travel place.

10. The operation method of claim 6, wherein the travel itinerary includes recent news generated in the travel place.

11. An operation method of a system for optimizing a travel itinerary, the operation method comprising:

a server generating a first travel itinerary based on travel information and local information, wherein the server includes a database and a processor, a first electronic device includes a display and an input means, the first electronic device receives the travel information from a user through the input device and transmits the travel information to the server via a network to be stored in the server;

the server transmitting the first travel itinerary to the first electronic device to be displayed on the display of the first electronic device;

the server generating a second travel itinerary based on change information or additional information about the first travel itinerary, wherein the first electronic device is configured to receive the change information, the additional information from the user through the input device and the server is configured to receive the change information and the additional information from the first electronic device via the network; and the server providing transmitting to the first electronic device the second travel itinerary so that the second travel itinerary is displayed on the display of the first electronic device, wherein the server stores photos and includes an image analysis system, wherein the travel information includes information about a travel place, a travel day and time, transportation, and accommodations, wherein the accommodations include a name and a reserved day and time, wherein the local information includes information about traffic in the travel place, accommodations in the travel place, a restaurant in the travel place, a landmark in the travel place, activity in the travel place, and news for the travel place, wherein the traffic in the travel place includes a real-time traffic situation, wherein the processor is configured to receive a photo instead of the travel place from the first electronic device via the network, and the server generates the travel place associated with the photo by analyzing the photo and comparing the photo with the photos stored in the server using the image analysis system, wherein the additional information includes information about a budget, the concept of travel, transportation, a preferred food, and a weight for each item included in the additional information, and wherein the change information includes information about a change in travel place, a change in start time of travel for each travel day and time, or a change in travel day and time, wherein the concept of travel is configured to be selected from a list which comprises rest, sightseeing, activity, and shopping.

\* \* \* \* \*